J. GIFFORD.
Cultivator.
No. 59,584.
Patented Nov. 13, 1866.
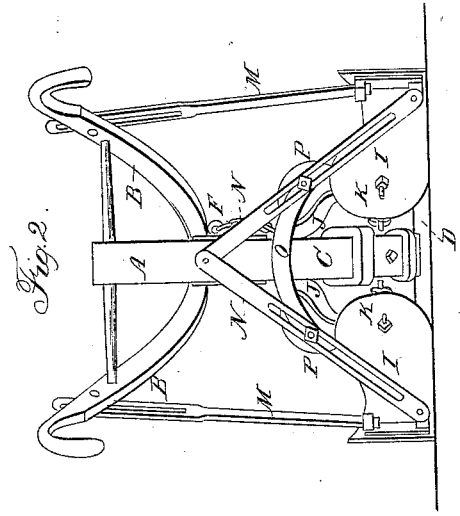
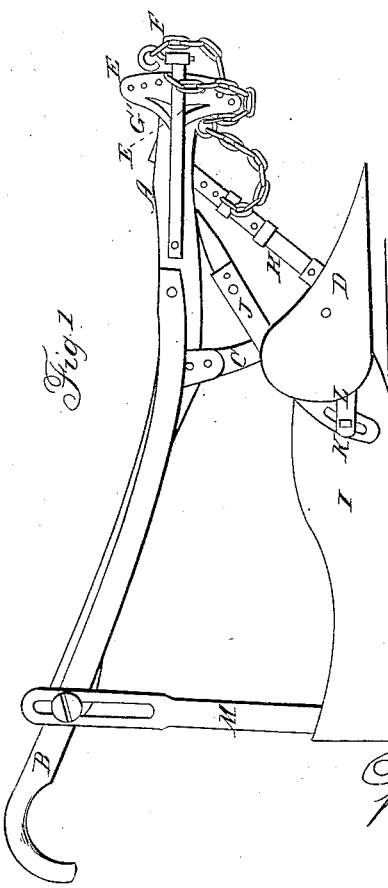

UNITED STATES PATENT OFFICE.

JOHN GIFFORD, JR., OF WATERTOWN, NEW YORK.

IMPROVEMENT IN HORSE-HOES.

Specification forming part of Letters Patent No. 59,584, dated November 13, 1866.

*To all whom it may concern:*

Be it known that I, JOHN GIFFORD, Jr., of Watertown, in the county of Jefferson and State of New York, have invented a new and Improved Horse-Hoe, which I call the "American Horse-Hoe; and I do hereby declare the following to be a full, clear, and exact description of the same, sufficient to enable any one skilled in the art to which the invention appertains to make use of it, reference being had to the accompanying drawing, which forms a part of this specification, and in which the invention is represented in a perspective view.

The improvement consists of a pair of wings applied to and extending laterally in the rear of the share, and made adjustable as to depth and breadth of furrow by means of braces, &c., extending from the standard-beam and handles to the said wings.

In the drawing, A is the beam of the machine; B B, the handles; C, the standard to which the share D is attached. The clevis E is regulated as to height by a pin, F, which engages with the required hole in the iron G, attached to the nose of the plow-beam. H is a draft-rod extending between the beam and the share.

The wings I I are supported in front by the brace J, which, being attached at its upper end to the beam A, passing downward, straddles the standard C, and the ends are attached to the wings by bolts K, the slots in the braces J permitting the wings to be adjusted vertically. The wings are respectively attached by means of bars L to the share, the bar being hooked to the inside of the share and secured to the wing by the bolt K.

The rear end of each wing is supported by means of braces M N, which depend from the handles B, and are secured by means of bolts or rivets to the wing. The brace N has a slot occupied by the bolt of O. The brace O, which is adjusted by means of the bolts P P in the slots of the braces N, forms a means of extension and contraction of the width apart of the rear ends of the wing I I. As the brace O is raised the wings are diverged, and as the brace is set in a lower position the wings are contracted or caused to approach each other. The lower end of the brace M is riveted or otherwise fastened to the wing. The wings are hung by a swivel-hinge in front working in a circular piece to hold them in place, and they are also made to reverse or turn over to enlarge the hill by means of the curved edge. The wings by the means detailed are adjustable in any direction for depth or width of furrow, or to assume any required angle with the ground to throw the soil as required.

Having described my invention, what I claim as new, and desire to secure by Letters Patent, is—

The reversible wings I I, attached to and following the share, and adjustably supported from the frame A B, substantially as described and represented.

JOHN GIFFORD, JR.

Witnesses:
 JOHN B. BALL,
 EDGAR WESCOTT.